United States Patent
Heiskanen et al.

(10) Patent No.: US 10,787,770 B2
(45) Date of Patent: Sep. 29, 2020

(54) CORRUGATED BOARD COMPRISING AN ADHESIVE COMPRISING STARCH AND FINE MICOFIBRILLATED CELLULOSE

(71) Applicant: Stora Enso OYJ, Helsinki (FI)

(72) Inventors: Isto Heiskanen, Imatra (FI); Seppo Lampainen, Lahti (FI); Kaj Backfolk, Lappeenranta (FI); Esa Saukkonen, Lappeenranta (FI); Jukka Kankkunen, Imatra (FI); Christian Aulin, Stockholm (SE); Astrid Odeberg Glasenapp, Täby (SE)

(73) Assignee: Stora Enso OYJ, Helsinki (FI)

( * ) Notice: Subject to any disclaimer, the term of this patent is extended or adjusted under 35 U.S.C. 154(b) by 42 days.

(21) Appl. No.: 16/346,002

(22) PCT Filed: Oct. 31, 2017

(86) PCT No.: PCT/IB2017/056756
§ 371 (c)(1),
(2) Date: Apr. 29, 2019

(87) PCT Pub. No.: WO2018/083590
PCT Pub. Date: May 11, 2018

(65) Prior Publication Data
US 2020/0056334 A1    Feb. 20, 2020

(30) Foreign Application Priority Data
Nov. 1, 2016 (SE) .................................. 1651440

(51) Int. Cl.
*D21H 27/40* (2006.01)
*C09J 5/06* (2006.01)
*C09J 101/02* (2006.01)
*C09J 103/02* (2006.01)

(52) U.S. Cl.
CPC ............... *D21H 27/40* (2013.01); *C09J 5/06* (2013.01); *C09J 101/02* (2013.01); *C09J 103/02* (2013.01); *C09J 2400/283* (2013.01)

(58) Field of Classification Search
CPC . D21H 27/40; C09J 5/06; C09J 101/02; C09J 103/02; C09J 2400/283
See application file for complete search history.

(56) References Cited

U.S. PATENT DOCUMENTS

| 4,134,781 A | 1/1979 | Carstens et al. |
| 2004/0033343 A1 | 2/2004 | Comeau et al. |
| 2004/0102546 A1 | 5/2004 | Skuratowicz et al. |
| 2015/0059996 A1 | 3/2015 | Zitturi et al. |
| 2016/0194527 A1 | 7/2016 | Bloembergen et al. |

FOREIGN PATENT DOCUMENTS

| CN | 1449913 A | 10/2003 |
| CN | 102639788 A | 8/2012 |
| CN | 103717803 A | 4/2014 |
| CN | 204325807 U | 5/2015 |
| CN | 204343106 U | 5/2015 |
| CN | 105542676 | 5/2016 |
| WO | 9715440 A1 | 5/1997 |
| WO | 2004055268 | 7/2004 |
| WO | 2009038735 A1 | 3/2009 |
| WO | 2011068457 | 6/2011 |
| WO | 2011160049 | 12/2011 |
| WO | 2013188739 A1 | 12/2013 |
| WO | 2014022666 A1 | 2/2014 |
| WO | 20140154937 A1 | 10/2014 |
| WO | 2016109888 A1 | 7/2016 |
| WO | 2017046754 A1 | 3/2017 |

OTHER PUBLICATIONS

Karlsson, Lennart, European Search Report for Application No. EP 17867747, dated Apr. 22, 2020.
International Searching Authority, Written Opinion of the International Searching Authority, PCT/IB2017/056756, dated May 11, 2018.
International Searching Authority, International Search Report, PCT/IB2017/056756, dated May 11, 2018.
Chinga-Carrasco, G., "Cellulose fibres, nanofibrils and microfibrils,: The morphological sequence of MFC components from a plant physiology and fibre technology point of view," Nanoscale research letters 2011, 6:417.
Fengel, D., "Ultrastructural behavior of cell wall polysaccharides," Tappi J., Mar. 1970, vol. 53, No. 3.
Chinese Patent Office, Chinese Office Action No. CN, 201780067064. 5, dated May 6, 2020.

*Primary Examiner* — Michael C Miggins
(74) *Attorney, Agent, or Firm* — Greer, Burns & Crain, Ltd.

(57) ABSTRACT

The present invention relates to a corrugated board comprising an adhesive arranged to attach a fluted corrugated medium to a liner wherein the adhesive comprises starch and microfibrillated cellulose. The invention also relates to a method to produce said corrugated board.

17 Claims, No Drawings

CORRUGATED BOARD COMPRISING AN ADHESIVE COMPRISING STARCH AND FINE MICOFIBRILLATED CELLULOSE

This application is a U.S. National Phase under 35 U.S.C. § 371 of International Application No. PCT/IB2017/056756, filed Oct. 31, 2017, which claims priority under 35 U.S.C. §§ 119 and 365 to Swedish Application No. 1651440-8, filed Nov. 1, 2016.

TECHNICAL FIELD

The present invention relates to a corrugated board comprising an adhesive arranged to attach a fluted corrugated medium to a liner wherein the adhesive comprises starch and microfibrillated cellulose. The invention also relates to a method to produce said corrugated board.

BACKGROUND

Corrugated board is a packaging material which can be converted to different types of packaging solutions. The corrugated board is a fiber based material comprising a corrugated medium (fluting) and at least one flat liner or linerboard attached onto a surface of the fluted medium, thus forming a sandwich structure. The central paper layer, called corrugated medium, is formed by using heat, moisture and pressure, into a corrugated shape using a corrugator. One or two flat papers, called liners, are glued to the tips of the corrugated medium. The sandwich can be formed in different ways such as in single, double, and triple walls as described in Kirwan M., J., Paper and Paperboard. Packaging Technology, Blackwell Publishing 2005.

There are different kinds of corrugated board qualities, and these might comprise different types of liners and corrugated medium. Examples of different types of liners are kraftliner, white top kraftliner and testliner. Kraftliner is typically produced from kraft pulp that can be bleached or unbleached and comprises one or more layers wherein top layer is often optimized to provide good printing surface and good moisture resistance. Testliner is mainly produced from recycled old corrugated board and is mostly done in two layers. Whereas first layer usually always comprise recycled fibers, the top layer might contain e.g. virgin fibers in order to provide a better quality. For corrugated mediums recycled or semichemical fibers are typically used.

Common for all corrugated board qualities is that they are made of high portion a renewable materials which makes it a sustainable packaging material compared to many other packaging materials.

The corrugated medium is joined or adhered to a flat liner with an adhesive. A second glue application step can be used to treat the corrugated medium on the backside prior to attaching a second liner to produce a double face corrugated board is formed. Starch based adhesives are most commonly used in the manufacturing of corrugated boards. The starch based adhesives are typically 4 component systems comprising of carrier or cooked starch, a raw starch component, caustic soda, and borax. The physical properties and chemical reactivity of the final adhesive can be adjusted by various means such as using modified starch, by changing borax concentration or using other cross-linkers.

A common problem with produced corrugated boards is that they tend to curl up or down. This problem is also called warp. The most common reason for corrugated boards to curl is due to a moisture imbalance between the liners. Curl often leads to problems in the converting step of the corrugated board where the board is jammed and cannot pass through the converting machine thereby causing production losses. One way to control the curl of corrugated board is to control the moisture content during production of the board. This is for example described in U.S. Pat. No. 4,134,781. Another way to control or reduce curl is to carefully select the adhesive used and method of application of adhesive. This is for example described in WO11160049 which describes a certain type of glue used in order to reduce the curling of the board.

Another common problem with corrugated board is the wash-board effect, also called wash-boarding. This effect is more pronounced for corrugated board comprising lower gram mage liner in the top layer/s. Wash-boarding is an undesired effect resulting from the corrugated board manufacturing process which might become even more visible after printing the surface. In addition to differences in optical print densities, it might also decrease the print quality.

The wash-board effect is usually associated as an effect of the interfacial glue spreading/absorption and shrinkage of the glue between the liner and the fluting during drying. As the adhesive dries the liner may take up the silhouette of the flutes. This uneven surface of the produced corrugated board is thus called wash-boarding. The degree of wash-boarding depends on many different features, e.g. the stiffness of the individual corrugated board materials, the solid content of the glue used as well as the amount of glue applied. The wash-board effect is increased if an excess of glue is applied during production of the corrugated board. There is often a balance between applying too little glue which will lead to inadequate lamination and too much glue which will increase the washboard effect. Also, if the glue has a high solid content of starch and a high viscosity the washboard effect can be decreased. However, the bonding strength decreases when higher amount of starch is used in the glue. Also, wash-boarding causes poor printing quality since the undulating surface is not optimal for printing and it leads to that the printed surface gets a very uneven appearance.

There is thus a need to solve the problems mentioned above for a corrugated board. More preferably, the solution should also be both cost-effective and environmental friendly.

SUMMARY

It is an object of the present invention to provide a corrugated board, which eliminates or alleviates at least some of the disadvantages of the prior art corrugated boards. More specific objects include providing a corrugated board having reduced washboard effect and curl tendency.

The invention is defined by the appended independent claims. Embodiments are set forth in the appended dependent claims and in the following description.

The present invention relates to a corrugated board comprising a corrugated medium, a liner and an adhesive arranged to attach the fluted corrugated medium to the liner wherein the adhesive comprises starch and microfibrillated cellulose characterized in that the microfibrillated cellulose has a Schopper-Riegler (SR) value above 97. It has surprisingly been found that a corrugated board comprising an adhesive comprising starch and microfibrillated cellulose where the MFC has a SR value above 97 can improve the quality of the corrugated board. It has been seen that both the curl and washboard tendencies are strongly reduced when the adhesive according to the invention is used. The addition of this specific kind of microfibrillated cellulose to the adhesive has made it possible to reduce the spreading of the adhesive on and into the corrugated board, meaning that the adhesive is more exactly located where it is needed with less penetration of the adhesive on as well as into the fluting and/or liner of the corrugated board.

The adhesive preferably comprises starch in an amount above 50 wt % of the total solid content of the adhesive, more preferably above 70 wt %. The adhesive preferably comprises microfibrillated cellulose in an amount between 0.5-50 wt-% of the total solid content of the adhesive. The optimal amount of starch and MFC in the adhesive depends for example on the quality of the MFC used, the type of starch used and the desired properties of the final adhesive to be achieved.

The starch in the adhesive is preferably a native starch. The adhesive may comprise a raw starch component. The adhesive may also comprise a starch carrier medium. With raw starch component is meant an uncooked starch granule that could be at least partly swollen by for example alkali treatment or temperature treatment.

The liner preferably has a grammage of below 160 g/m$^2$. It has been shown possible to produce a good quality corrugated board with less wash-boarding problems even when a liner with low grammage is used.

The amount of adhesive in the corrugated board is preferably between 3-20 g/m$^2$ (dry).

The present invention also relates to an adhesive for corrugated board wherein said adhesive comprises starch and microfibrillated cellulose and wherein the microfibrillated cellulose has a Schopper-Riegler (SR) value above 97. It has been found that the addition of a microfibrillated cellulose with a very high SR value reduces the penetration of the adhesive into the board.

The adhesive preferably has a solid content between 10-45% by weight, preferably between 20-40% by weight. The use of microfibrillated cellulose shows that the viscosity behavior at low shear rates can be influenced which we believe have great impact on adhesive setting behavior spreading in the interface between the corrugated medium and the liner. The ability to control flow behavior of the adhesive at low shear rates, for example without changing the flowability at higher shear rates is important for adhesive holdout on absorptive or porous substrates such as corrugated papers and/or liners.

The adhesive preferably comprises more than 50 wt-% starch based on total dry solid content of the adhesive. The adhesive preferably comprises both a raw starch component and a starch carrier medium, i.e. both cooked and uncooked starch.

The adhesive preferably comprises between 0.1-50 wt-% of microfibrillated cellulose based on total dry solid content of the adhesive.

The adhesive is further characterized by features appearing in the embodiments related to the corrugated board comprising said adhesive.

The present invention further relates to a method for producing a corrugated board comprising the steps of; providing a corrugated medium and a liner, providing an adhesive comprising starch and microfibrillated cellulose wherein the microfibrillated cellulose has a Schopper-Riegler (SR) value above 97 and adding the adhesive between the corrugated medium and the liner so that the corrugated medium is attached to said liner.

The adhesive provided in the method is preferably made by swelling the starch by alkali or temperature treatment and adding the microfibrillated cellulose either before, during or after the swelling of the starch. The adhesive may also involve cooking the starch to form a starch carrier medium and adding the microfibrillated cellulose either before, during or after cooking of the starch. The temperature of the added microfibrillated cellulose is preferably above 30° C., preferably above 50° C. It is important that the temperature of the starch is increased when the MFC is added during or after cooking of the starch, i.e. when the temperature of the starch also is increased. In this way the adhesive produced is more homogeneous which leads to a better quality adhesive that makes it possible to produce a corrugated board having reduced wash-boarding and curl problems.

The method is further characterized by features appearing in the embodiments related to the corrugated board comprising said adhesive and the embodiments of said adhesive.

DETAILED DESCRIPTION

The present invention relates to a corrugated board comprising a corrugated medium (fluting), a liner and an adhesive. The adhesive is arranged between the corrugated medium and the liner so that the corrugated medium is attached to the liner. The corrugated board comprises at least one corrugated medium and at least one liner. The corrugated board preferably comprises at least two liners and at least one corrugated medium. The corrugated board may also comprise more than one corrugated mediums and more than two liners. The liner is attached to at least one surface of the corrugated medium by the adhesive. The adhesive is preferably applied on a least one surface of the fluted corrugated medium and the liner is thereafter attached to said surface.

By utilizing MFC in the adhesive in accordance to the present invention, it is possible to have broader operating press window in the adhesive applicator without negatively affecting the adhesive setting and penetration. Without being bound to any theories, we believe that novel formulations prevent less infiltration and hence better adhesive holdout. The adhesive nip can be operated at higher pressure range and at higher speed. It gives also possibility to have higher open time between the application of the adhesive and joining the surfaces. It is also believed that the wet tack is improved with the glue The adhesive is a glue that is based on starch that can be extracted from a wide variety of plants. Some of the most common plants are maize, wheat, rice, potato, tapioca and peas. The starch is preferably native, i.e. no modification of the starch has been done. The adhesive may also comprise water, sodium hydroxide and boric acid. Other additives, such as additives to improve the wet strength or adhesive bond strength could also be added. Also, other functional chemicals in order to improve e.g. moisture resistance or gelling behavior can be added, e.g. borax, glyoxal or mixtures thereof.

The adhesive preferably comprises a raw starch component. The adhesive may also comprise a starch carrier medium. With raw starch component is meant an uncooked starch granule that could be partly swollen by for example alkali treatment, temperature treatment and/or by other treatments known in prior art. With starch carrier medium is meant a cooked dissolved starch or a cold water dissolvable starch.

The adhesive also comprises microfibrillated cellulose with a Schopper-Riegler (SR) value above 97. It has surprisingly been found that adhesive comprising microfibrillated cellulose with a SR value above 97 reduces the wash-boarding as well as curling tendency of the corrugated board. The MFC with a SR value above 97 is a very fine MFC grade and it was surprising that the presence of a fine MFC quality could reduce the washboard effect as well as the curl tendency to such high degree. The Schopper-Riegler value can be obtained through the standard method defined in EN ISO 5267-1.

The corrugated board preferably comprises a liner having a low grammage, preferably below 160 g/m$^2$. It is a surprise that even using low grammage liner the wash-boarding problems is strongly reduced by using the adhesive according to the invention.

The viscosity of adhesive depends on numerous parameters but including type of starch, modification, additives, temperatures, pH, solid content and ionic strength. The use of MFC in the adhesive reduces the uncontrolled retrogradation of the starch.

The present invention also relates to a method for producing a corrugated board comprising the steps of; providing a corrugated medium and a liner, providing an adhesive comprising starch and microfibrillated cellulose wherein the microfibrillated cellulose has a Schopper-Riegler (SR) value above 97 and adding the adhesive between the corrugated medium and the liner so that the corrugated medium is attached to said liner. It is possible to add the adhesive to the surface of the liner and/or to the corrugated medium and them attach the corrugated medium and the liner to each other.

The adhesive is formed by mixing the components of the adhesive including starch and microfibrillated cellulose in any conventional way as described in prior art and which will is well known for a person skilled in the art. It is preferred that the adhesive is formed by including the steps of swelling the starch by alkali or temperature treatment to form a raw starch component and adding the microfibrillated cellulose either before, during or after the swelling of the starch. The adhesive may also be formed by cooking the starch to form a starch carrier medium and adding the microfibrillated cellulose either before, during or after cooking of the starch. The microfibrillated cellulose is preferably added to the starch in the form of an aqueous suspension, in dewatered, concentrated and/or dry form. It may be preferred to increase the temperature of the added microfibrillated cellulose, preferably the suspension comprising MFC before addition to the starch. This is especially important if the temperature of the starch is increased. By heating also the MFC before the addition the temperature difference between the starch and the MFC is reduced which will lead to that a more homogenous adhesive is formed. The temperature of the added microfibrillated cellulose is preferably above 30° C., more preferably above 50° C., even more preferably above 70° C. The temperature of the MFC may be between 50-90° C., more preferably between 60-80° C. Furthermore, the pH of the microfibrillated cellulose added, preferably the suspension comprising microfibrillated cellulose is adjusted so that the pH of the MFC is similar to the pH of the starch or mixture comprising starch to which the MFC is added.

The mixture of MFC and starch may also be mechanical or temperature treated during formation of the adhesive. For example high shear mixing and/or jet cooking can be used.

The corrugated board liner/s and/or corrugated medium may be produced by any kind of pulp, e.g. chemical pulp, mechanical pulp, thermomechanical pulp and chemi-thermomechanical pulp (CTMP), and neutral sulphite semichemical (NSSC) pulp. The pulp may further be any one of a virgin and a re-cycled pulp.

Microfibrillated cellulose (MFC) shall in the context of the patent application mean a nano scale cellulose particle fiber or fibril with at least one dimension less than 100 nm.

MFC comprises partly or totally fibrillated cellulose or lignocellulose fibers. The liberated fibrils have a diameter less than 100 nm, whereas the actual fibril diameter or particle size distribution and/or aspect ratio (length/width) depends on the source and the manufacturing methods. The smallest fibril is called elementary fibril and has a diameter of approximately 2-4 nm (see e.g. Chinga-Carrasco, G., *Cellulose fibres, nanofibrils and microfibrils: The morphological sequence of MFC components from a plant physiology and fibre technology point of view, Nanoscale research letters* 2011, 6: 417), while it is common that the aggregated form of the elementary fibrils, also defined as microfibril (Fengel, D., *Ultrastructural behavior of cell wall polysaccharides*, Tappi J., March 1970, Vol 53, No. 3.), is the main product that is obtained when making MFC e.g. by using an extended refining process or pressure-drop disintegration process. Depending on the source and the manufacturing process, the length of the fibrils can vary from around 1 to more than 10 micrometers. A coarse MFC grade might contain a substantial fraction of fibrillated fibers, i.e. protruding fibrils from the tracheid (cellulose fiber), and with a certain amount of fibrils liberated from the tracheid (cellulose fiber).

There are different acronyms for MFC such as cellulose microfibrils, fibrillated cellulose, nanofibrillated cellulose, fibril aggregates, nanoscale cellulose fibrils, cellulose nanofibers, cellulose nanofibrils, cellulose microfibers, cellulose fibrils, microfibrillar cellulose, microfibril aggregrates and cellulose microfibril aggregates. MFC can also be characterized by various physical or physical-chemical properties such as large surface area or its ability to form a gel-like material at low solids (1-5 wt %) when dispersed in water. The cellulose fiber is preferably fibrillated to such an extent that the final specific surface area of the formed MFC is from about 10 to about 300 m$^2$/g, or more preferably 30-200 m$^2$/g when determined for a freeze-dried material with the BET method.

Various methods exist to make MFC, such as single or multiple pass refining, pre-hydrolysis followed by refining or high shear disintegration or liberation of fibrils. One or several pre-treatment step is usually required in order to make MFC manufacturing both energy efficient and sustainable. The cellulose fibers of the pulp to be supplied may thus be pre-treated enzymatically or chemically, for example to reduce the quantity of hemicellulose or lignin. The cellulose fibers may be chemically modified before fibrillation, wherein the cellulose molecules contain functional groups other (or more) than found in the original cellulose. Such groups include, among others, carboxymethyl (CMC), aldehyde and/or carboxyl groups (cellulose obtained by N-oxyl mediated oxydation, for example "TEMPO"), or quaternary ammonium (cationic cellulose). After being modified or oxidized in one of the above-described methods, it is easier to disintegrate the fibers into MFC or nanofibrillar size or NFC.

The nanofibrillar cellulose may contain some hemicelluloses; the amount is dependent on the plant source. Mechanical disintegration of the pre-treated fibers, e.g. hydrolysed, pre-swelled, or oxidized cellulose raw material is carried out with suitable equipment such as a refiner, grinder, homogenizer, colloider, friction grinder, ultrasound sonicator, fluidizer such as microfluidizer, macrofluidizer or fluidizer-type homogenizer. Depending on the MFC manufacturing method, the product might also contain fines, or nanocrystalline cellulose or e.g. other chemicals present in wood fibers or in papermaking process. The product might also contain various amounts of micron size fiber particles that have not been efficiently fibrillated. MFC is produced from wood cellulose fibers, both from hardwood or softwood fibers. It can also be made from microbial sources, agricultural fibers such as wheat straw pulp, bamboo, bagasse, or other non-wood fiber sources. It is preferably made from pulp including pulp from virgin fiber, e.g. mechanical, chemical and/or thermomechanical pulps. It can also be made from broke or recycled paper.

The above described definition of MFC includes, but is not limited to, the new proposed TAPPI standard W13021 on cellulose nanofibril (CNF) defining a cellulose nanofiber material containing multiple elementary fibrils with both crystalline and amorphous regions, having a high aspect ratio with width of 5-30 nm and aspect ratio usually greater than 50.

EXAMPLE

Adhesives were prepared by mixing 5 wt % MFC of different quality with wheat starch (9.6 g), water and NaOH, followed by stirring and heating at 45° C. to form a mixture.

Thereafter, more wheat starch (75.6 g) and water was added to the mixture in a second step and stirred at 35° C. for 30 minutes. If the adhesive comprises 10 wt-% of MFC, an additional 5 wt-% MFC was also added in the second step together with the additional starch and water. The amount of starch in each adhesive can be seen in Table 1 where the glue solid content is shown which represents the amount of starch and MFC in the adhesive. For the reference adhesives, 1.1 wt-% of Borax in relation to total amount of starch was added.

The coarse MFC grade added has a SR value below 97. The fine MFC grade added has a SR value above 97.

The adhesive characterization and application of adhesive on a corrugated board was performed at room temperature (23° C.) and at a pH of about 12. The viscosity of the adhesive was measured using a rheometer (Malvern Kinexus pro) operated with a shear rate between 0.01-1000 1/s.

The adhesive prepared above was thereafter used for the production of a corrugated board comprising one liner attached to each side of a corrugated medium. The application of the adhesive was done in a SUW Gluability tester and the adhesion strength of the liner was done by PIN Adhesion test (PAT). The corrugated boards were dried at two temperatures, i.e. 110° C. and 180° C., respectively. The washboard effect, i.e. the unevenness of the outer liner of corrugated board, was measured optically by Optitopo. Optitopo generates two images of the same exact region of a sample by illuminating in low angles from opposite directions. A height map is thereafter calculated using a "photometric stereo" technique. Topography variations at different wavelength classes are generated and the average wash-board is given in μm.

It could be seen that at higher shear rates the viscosity of the starch-MFC adhesives are similar as for the starch borax reference sample. The adhesive according to the invention, comprising MFC-starch with a MFC having a SR value above 97, shows a stronger shear thinning behavior, i.e. a higher viscosity at low shear rates, which is beneficial in adhesive setting. The wash-board effect is also improved with the addition of a MFC having a SR value above 97. Also, the PAT value is increased which means that the adhesion is very good.

TABLE 1

|  | 1A | 1B | 2A | 3A | 3B | 4A (Ref) | 4B (Ref) |
|---|---|---|---|---|---|---|---|
| Basic component | Starch | Starch | Starch | Starch | Starch | Starch | Starch |
| Additive |  |  |  |  |  | Borax | Borax |
| MFC amount/Grade (wt-%) | 5% MFC Coarse | 5% MFC Coarse | 10% MFC Coarse | 5% MFC Fine | 5% MFC Fine |  |  |
| Glue solid content (wt-%) | 23.2 | 23.2 | 24.0 | 22.3 | 22.3 | 22.5 | 22.5 |
| pH | 12 | 12 | 12 | 12 | 12 | 12 | 12 |
| Drying Temperature (° C.) | 110 | 180 | 110 | 110 | 180 | 110 | 180 |
| Washboard (um) | 163 | 289 | 133 | 124 | 251 | 161 | 272 |
| Viscosity (1 1/s) Pa s | 10 | 10 |  | 40 | 40 | 0.8 | 0.8 |
| Viscosity (100 1/s) Pa s | 0.4 | 0.4 |  | 1 | 1 | 0.4 | 0.4 |
| PAT Adhesion (N/m) | 550 | 490 | 490 | 520 | 380 | 600 | 400 |

Consequently, it is clearly shown in Table 1 that an adhesive comprising finer MFC grades makes it possible to produce a corrugated board having increased quality with good strength and reduced wash-boarding.

In view of the above detailed description of the present invention, other modifications and variations will become apparent to those skilled in the art. However, it should be apparent that such other modifications and variations may be effected without departing from the spirit and scope of the invention.

The invention claimed is:

1. A corrugated board comprising a fluted corrugated medium, a liner and an adhesive arranged to attach the fluted corrugated medium to the liner wherein the adhesive comprises starch and microfibrillated cellulose, the microfibrillated cellulose having a Schopper-Riegler (SR) value above 97.

2. The corrugated board according to claim 1 wherein the adhesive comprises starch in an amount above 50 wt % of the total solid content of the adhesive.

3. The corrugated board according to claim 1 wherein the adhesive comprises microfibrillated cellulose in an amount between 0.5-50 wt-% of the total solid content of the adhesive.

4. The corrugated board according to claim 1 wherein the starch in the adhesive is a native starch.

5. The corrugated board according to claim 1 wherein the adhesive comprises a raw starch component.

6. The corrugated board according to claim 1 wherein the adhesive comprises a starch carrier medium.

7. The corrugated board according to claim 1 wherein the liner has a grammage of below 160 g/m².

8. The corrugated board according to claim 1 wherein the board comprises adhesive in an amount of 3-20 g/m² (dry).

9. An adhesive for corrugated boards wherein said adhesive comprises starch and a microfibrillated cellulose wherein said microfibrillated cellulose has a Schopper-Riegler (SR) value above 97.

10. The adhesive according to claim 9 wherein the adhesive has a solid content between 10-45 wt-%.

11. The adhesive according to claim 9 wherein the adhesive comprises more than 50 wt-% starch based on total dry solid content of the adhesive.

12. The adhesive according claim 9 wherein the adhesive comprises both a raw starch component and a starch carrier medium.

13. The adhesive according to claim 9 wherein the adhesive comprises between 0.1-50 wt-% of microfibrillated cellulose based on total dry solid content of the adhesive.

14. A method for producing a corrugated board comprising the steps of;
providing a corrugated medium and a liner,
providing an adhesive comprising starch and microfibrillated cellulose wherein the microfibrillated cellulose has a Schopper-Riegler (SR) value above 97 and
adding the adhesive between the corrugated medium and the liner so that the corrugated medium is attached to said liner.

15. The method according to claim 14 wherein the adhesive is made by swelling the starch by alkali or temperature treatment and adding the microfibrillated cellulose either before, during or after the swelling of the starch.

16. The method according to claim 14 wherein the adhesive is made by cooking the starch to form a starch carrier medium and adding the microfibrillated cellulose either before, during or after cooking of the starch.

17. The method according to claim 15 wherein temperature of the added microfibrillated cellulose is above 30° C.

* * * * *